United States Patent
Cox

(10) Patent No.: US 7,260,749 B2
(45) Date of Patent: Aug. 21, 2007

(54) HOT PLUG INTERFACES AND FAILURE HANDLING

(75) Inventor: Alan Cox, Swansea (GB)

(73) Assignee: Red Hat, Inc., Research Triangle Park, NC (US)

( * ) Notice: Subject to any disclaimer, the term of this patent is extended or adjusted under 35 U.S.C. 154(b) by 625 days.

(21) Appl. No.: 10/349,159

(22) Filed: Jan. 22, 2003

(65) Prior Publication Data

US 2004/0143776 A1 Jul. 22, 2004

(51) Int. Cl.
*G06F 11/00* (2006.01)
(52) U.S. Cl. .......................... 714/44; 714/43; 710/100
(58) Field of Classification Search .................. 714/5, 714/25, 28, 36, 43, 44; 713/2; 710/8–10, 710/100
See application file for complete search history.

(56) References Cited

U.S. PATENT DOCUMENTS

| | | | |
|---|---|---|---|
| 5,432,916 A | 7/1995 | Hahn et al. ................ 710/302 |
| 5,671,402 A | 9/1997 | Nasu et al. ................ 395/568 |
| 5,675,813 A * | 10/1997 | Holmdahl .................. 713/310 |
| 6,073,193 A * | 6/2000 | Yap ............................ 710/100 |
| 6,647,452 B1 * | 11/2003 | Sonoda ...................... 710/305 |
| 6,704,827 B1 * | 3/2004 | Smith et al. ............... 710/302 |
| 6,738,834 B1 * | 5/2004 | Williams et al. .............. 710/8 |
| 6,754,725 B1 * | 6/2004 | Wright et al. ................. 710/8 |
| 7,082,598 B1 * | 7/2006 | Le et al. .................... 717/127 |

* cited by examiner

*Primary Examiner*—Robert W. Beausoliel
*Assistant Examiner*—Emerson Puente
(74) *Attorney, Agent, or Firm*—Wilmer Cutler Pickering Hale & Dorr LLP

(57) ABSTRACT

An error handling method/system for correcting an error stimulates a removal of the device from the computer and automatically turns off the device. The method/system also automatically turns on the device and stimulates an insertion of the device. This allows a pre-existing initialization routine to correct the error.

19 Claims, 4 Drawing Sheets

HOT PLUG INTERFACES AND FAILURE HANDLING

FIELD OF THE INVENTION

This invention relates to using hot plug interfaces to simplify error handling routines for Input/Output devices of computers.

BACKGROUND OF THE INVENTION

As shown in FIG. 1, a conventional computer includes, among other things, a Central Processing Unit (CPU) 101, Input/Output (I/O) bus 103 and I/O devices 105. The I/O bus 103 allows information to flow between the I/O devices 105, the CPU 101 and Random Access Memory (RAM). Examples of buses are ISA (Industry Standard Architecture), EISA (Extended Industry Standard Architecture), PCI (Peripheral Component Interconnect), and MCA (Micro Channel Architecture).

Typical I/O devices include key boards, printers, network devices, game devices, etc. The I/O bus, in turn, is connected to each I/O device by means of a hierarchy of hardware components including: I/O ports 107, interfaces, and device controllers 109. Each device connected to the I/O bus has its own set of I/O addresses. In operation, the CPU selects an I/O port and uses the I/O bus to transfer data between a CPU register and the port.

In particular, in an exemplary arrangement as shown in FIG. 2, the CPU 101 writes into a control register 201 the commands to be sent to the I/O device and reads from a status register 203 a value that represents the internal state of the I/O device. The CPU 101 also fetches data from the I/O device by reading bytes from an input register 205 and pushes data to the I/O device by writing bytes into an output register 207.

An I/O interface 209 is a hardware circuit and/or software operating between a group of I/O ports and the corresponding device controller. It acts as an interpreter that translates the values in the I/O ports into commands and data for the device. In the opposite direction, it detects changes in the device state and correspondingly updates the I/O port that plays the role of status register. Examples of common interfaces are: keyboard interface, disk interface, bus mouse interface, network interface, parallel port, serial port, Universal Serial Bus (USB), PCMCIA interface, PCI interface, SCSI interface, etc.

The system level operations of the above-described components are performed by an operating system that includes a kernel. The kernel provides basic services for the operating system. Typically, the kernel (or any comparable center of an operating system) includes an interrupt handler that handles all requests or completed I/O operations that compete for the kernel's services, a scheduler that determines which programs share the kernel's processing time in what order, and a supervisor that actually gives use of the computer to each process when it is scheduled.

In conventional operating systems, the kernel is required to handle I/O device errors. Many error handling routines and the calls made by those routines are complex and extensive. In order to handle individual errors for all I/O devices, the kernel itself becomes complex. This complexity tends to lengthen the development time of the kernel. It also makes the debugging and maintenance of the kernel an arcane and difficult process.

SUMMARY OF THE INVENTION

The kernel of the present invention includes simplified routines for recovering from I/O device errors using existing driver functionality. In other words, extensive and complex routines to handle individual errors are not required in the kernel of the present invention. This simplification is possible because most, if not all, errors are rectifiable by simply turning off the I/O device and turning back on the device. By providing the kernel with routines to either cycle through the power (i.e., turning off/on) or simulate such an event, the rectifiable errors are corrected. Examples of the rectifiable errors include many hardware failures and almost all failures that can be resolved completely in software.

An example of the existing driver functionality is the hot plugging feature, which allows attaching a driver to a newly available device and removing a driver when a device becomes unavailable. Using the hot plugging feature, the kernel can fence a problem I/O device. After the device is fenced, the kernel can simulate a hot plugging event (e.g., cycling through the power of the device or simulating plugging in the device). The kernel then can put the device back online if the error has been corrected by the initialization routine of the I/O device. Because the initialization routines and the like are already part of the I/O driver, the kernel is not required to include its own error handling routines.

DETAILED DESCRIPTION OF EMBODIMENTS OF THE PRESENT INVENTION

Figure 1:
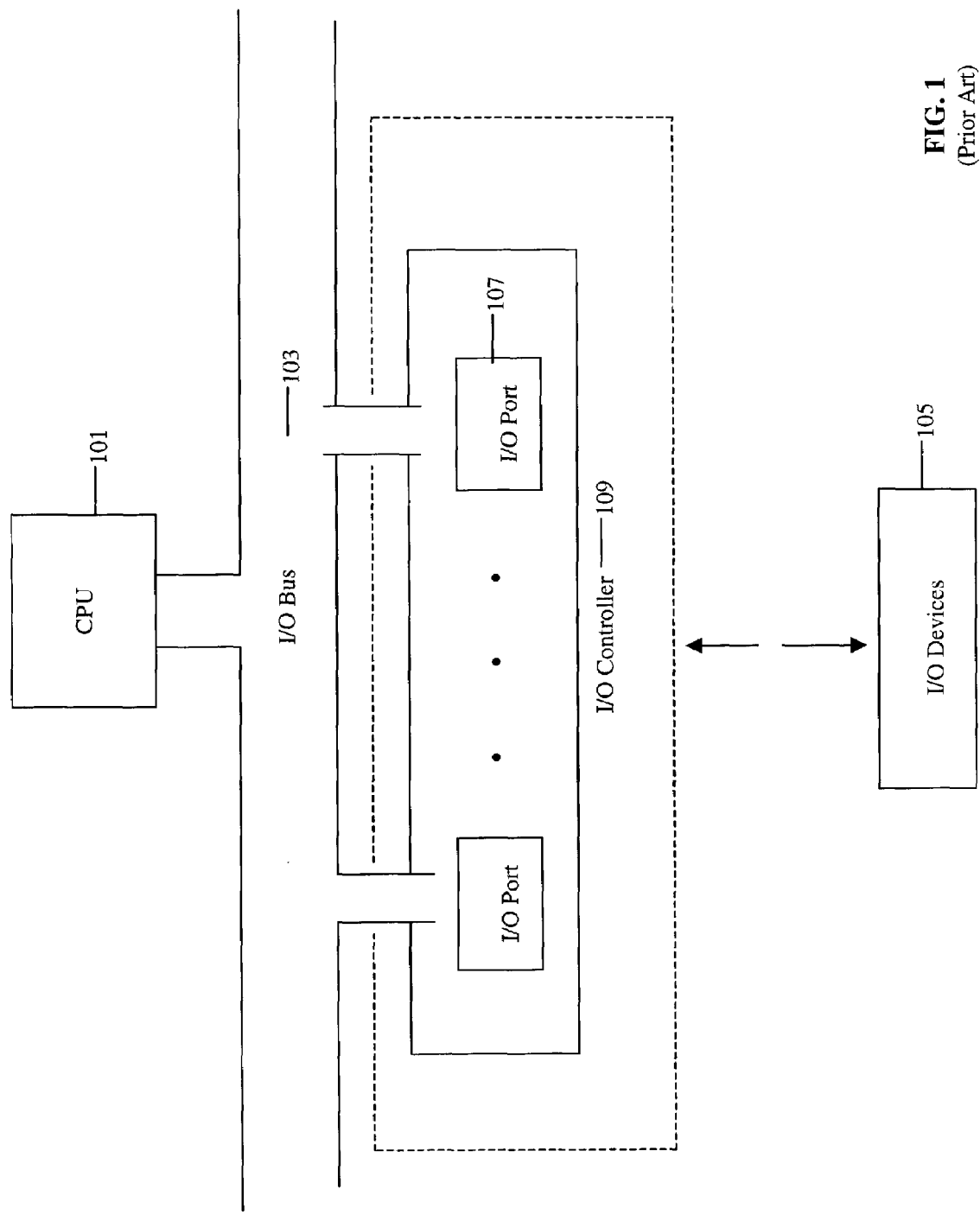
FIG. 1 is a schematic drawing of conventional input/output (I/O) architecture.
Figure 2:
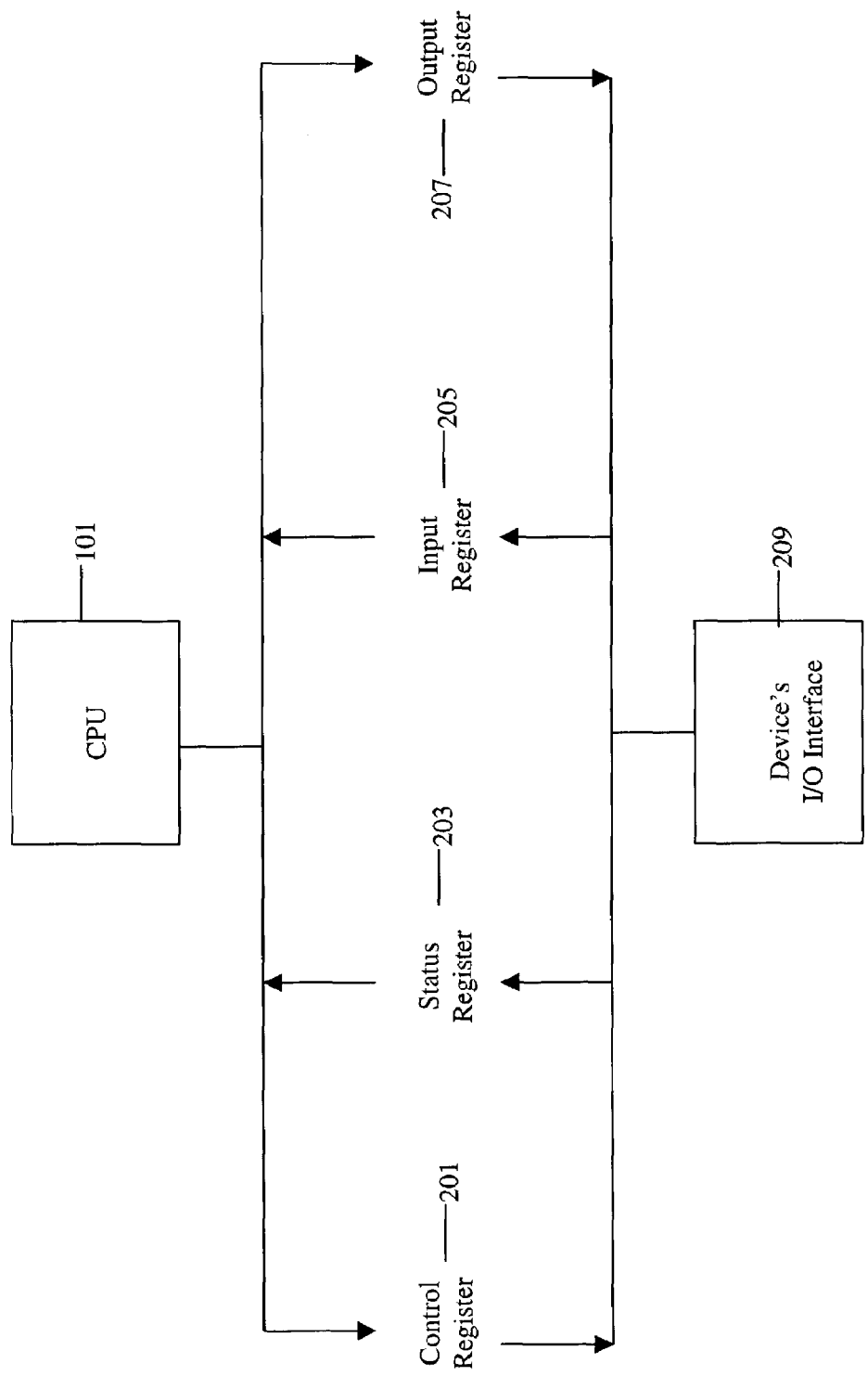
FIG. 2 is a schematic drawing of conventional I/O ports.

The present invention provides mechanisms to handle errors in computer I/O devices. A large number of errors including atypical errors and/or hard to diagnose errors can be handled by the present invention in a simplified manner. The following description of the present invention includes discussions relating to errors, error detection, the hot plugging feature, using the hot plugging feature in handling errors and an example of the present invention using the PCI bus interface.

Many possible errors may occur in the I/O devices/interfaces. For example, a network card may stop copying data from a network into the memory of a computer. The card may still be functioning as a network card but it can no longer actually put data anywhere in the computer.

In handling such an error, the first step is to detect it. A conventional routine to detect certain errors during run time for a tc-35815 driver for Linux™ may appear as follows:

```
/* put Free Buffer back to controller */
int bdctl = le32_to_cpu(lp->rfd_cur->bd[bd_count -1].B
unsigned char id =
    (bdctl & BD_RxBDID_MASK) >> BD_RxBDID_SHIFT;
```

-continued

```
    if (id >= RX_BUF_PAGES) {
        printk("%s: invalid BDID.\n", dev->name);
        panic_queues(dev);
    }
```

In this example, the "panic_queues" function stops the operation of the "dev" (an I/O device) because the kernel is incapable of handling the error. Even in the cases that the kernel is capable of handling the error, the required recovery routines can be complex. In conventional computers, the kernel is required to detect and handle such an error and all other errors or cause a panic as illustrated above.

In the present invention, the above example routine can be modified to stop the processing and call a simplified error handling routine. It requires less code than the "panic_queues" routine and the simplified routine can also be shared among different I/O drivers.

The simplified routine is described below in connection with the hot plugging feature. The hot plugging feature is available in many standard operating systems. For example, starting with kernel 2.4 (in January 2001), the hot plugging feature became a standard feature of Linux™. Initially, the hot plugging feature included support for USB and PCI (Cardbus) devices. Updated versions include IEEE 1394 (Firewire/i.Link) support as well. On mainframes, S/390 channel devices use the hot plugging feature, for example, to report device attach and other state change events. The hot plugging feature is also available with Windows, Mac OS, and other operating systems.

In particular, the hot plugging feature allows a user to plug in new devices and use them immediately without having to turn on/off the computer. Because of this feature, users are not required to learn system administration in depth. Instead, I/O devices will at least partially auto-configure themselves using, among others, insert/removing handling routines provided by the hot plugging feature.

The following are example pseudo codes for the insert/remove handling routine in the generic hot plugging feature in Linux™:

An interrupt or other event tells the OS hardware has changed
  The OS finds what has changed (hardware specific task)
  IF a device was removed
  Call the device 'remove one' handler
  Destroy generic data structures for the device
  ELSE
  Read the new hardware
  Create generic data structures representing it
  Make device available, assign resources etc
  Look for a driver that can handle it
  Call driver 'init_one' handler
  DONE As illustrated above, the hot plugging feature includes routines to initialize, remove, and power up/down the I/O device. In other words, the hot plugging feature provides basic services including software codes for error handling during initialization, removal and powering up/down the I/O device. Because of these basic services, the kernel is not required to have its own routines if the errors are handled using the hot plugging feature.

Figure 3:
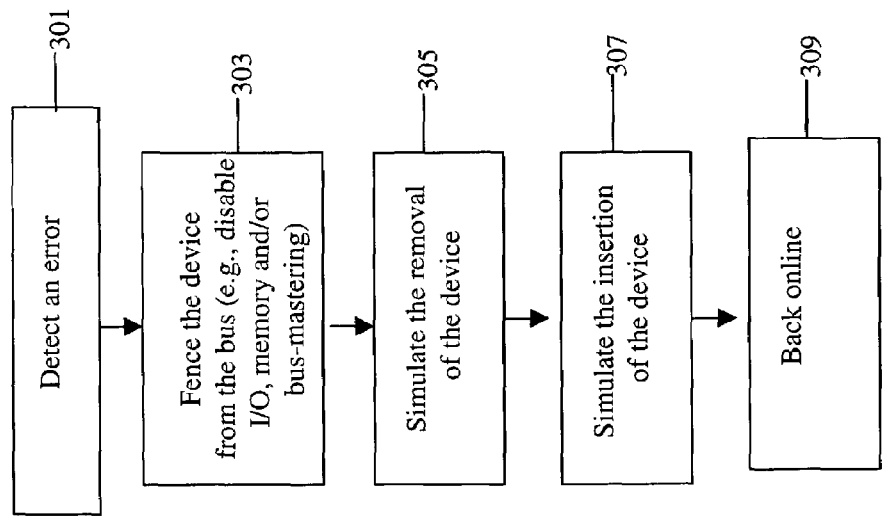
FIG. 3 is a flow chart depicting high level steps handling errors according to an embodiment of the present invention.

Hence, instead of having all disparate error handling codes in the kernel (as done conventionally), the kernel can simulate hot plugging and take advantage of the existing basic services. In particular, when the kernel simulates turning off/on an I/O device, the kernel is not required to include codes for initialization and handling of errors. In the present invention, the error handling can:
  Call the device remove one handler
  [Power off and on]
  Call the device init_one handler The above described pseudo code is further illustrated in FIG. 3 in detail. As shown in the figure, when an error is detected, it is communicated to the kernel (step 301). The kernel then fences the I/O device from the I/O bus (step 303). This fencing step may include, among other things, disabling the data I/O, disabling the I/O device from writing/reading from the RAM, and/or disabling the control of the I/O device. Once the I/O device is safely fenced, the kernel then simulates a removal of the I/O device from the I/O bus (step 305).

The I/O device can then be put back online (e.g., simulates an insertion of the I/O device, step 307) in a number of different ways. For example, the I/O device may put back online after waiting for a certain period of time (e.g., a tenth of a second). In another example, the I/O device may put back online when more time/resource is available. For instance, if the I/O device is controlling a precision drill, it may wait until the drill completes its present task before reinitializing it. In yet another example, the I/O device may put back online when the I/O device is called for. For instance, if a disk driver fails, it can be put back online when a read/write command to the disk is received.

Rectifiable errors can be corrected as described above. For instance, when the hardware and software are confused about each other's state, such an error can be rectified by turning off/on the device.

Where there is an unrectifiable error, the I/O device may fall into a loop continually trying to restart it with delays between attempts. Examples of unrectifiable errors are disconnected cables, overheated hardware components, etc. Under such circumstances, the initialization routine finds the device faulty and refuses to claim it. For example, the IBM lanstreamer token ring driver uses the following code:

```
writew(readw(streamer_mmio + LAPWWO) + 6, streamer_mmio + LAPA);
if (readw(streamer_mmio + LAPD)) {
    printk(KERN_INFO "tokenring card intialization failed: %d\n",
        ntohs(readw(streamer_mmio + LAPD)));
    release_region(dev->base_addr, STREAMER_IO_SPACE);
    /* Don't claim the device */
    return -1;
}
```

A more detailed example of the simplified error handling routine is described below in relation with the PCI bus. With respect to basic features of the PCI bus, it has a number of operation states, which are controlled by the operating system. These states are designated as "D0," "D1," "D2" and "D3." Conventionally, the D0 state is a normal operations state, and the D3 state is a powering off state. In the D3 state, the I/O devices connected to the bus are turned off except for the functionalities required to physically turn off/on the I/O devices.

The PCI bus also includes a master flag that allows the kernel to stop I/O devices connected to the bus from communicating with the CPU. By clearing the master flag, the PCI bus prevents the devices from corrupting the rest of the computer. When the master flag is cleared, the device is not allowed to write to the memory of the computer.

Figure 4:
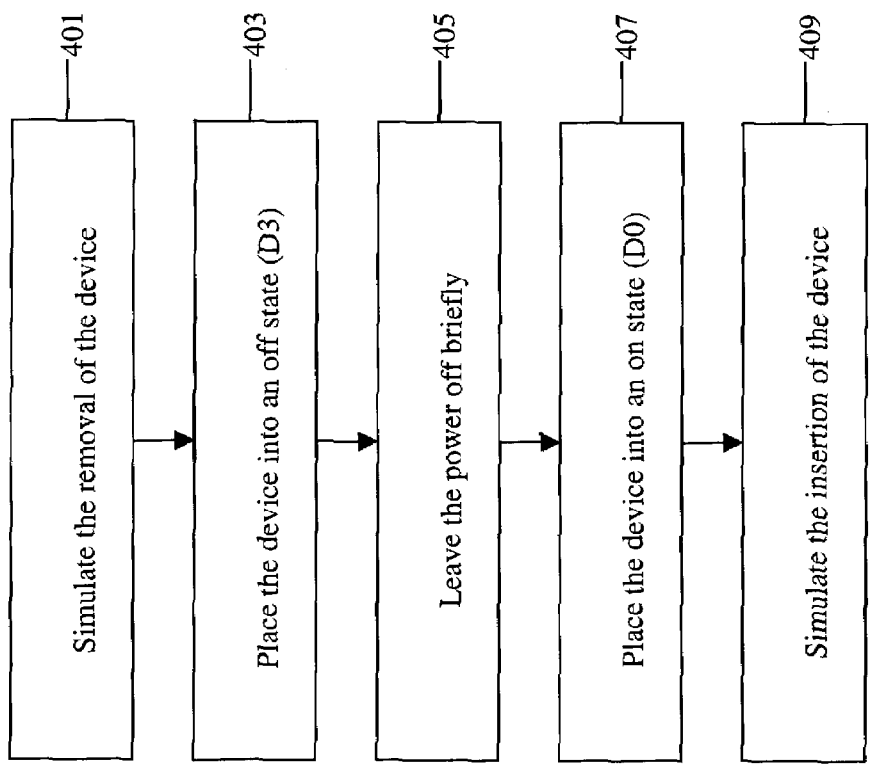
FIG. 4 is a flow chart depicting an example of detailed error handling steps according to an embodiment of the present invention.

By referencing FIG. 4, the simplified error handling routine of the present invention is illustrated using the features of the PCI bus described above. When the driver detects an error, it informs the kernel. The kernel fences the I/O device by clearing the master flag. After the master flag has been cleared, the kernel then simulates a hot plug notification to the driver indicating the device has been removed (step 401) and, then, drops the I/O device into a powered off state (step 403). For the PCI bus, this is the state referred to as 'D3' by the specification. At this point, the I/O device is physically turned off by the kernel (step 405). In the PCI bus, the kernel is configured to control the power on/off states of the I/O device. In other embodiments, if the kernel cannot control the power on/off states, as in the USB, then the kernel is configured to simply simulate turning off/on the I/O device.

After a certain period of time (e.g., a tenth of a second), the I/O device can be brought back to normal operation. For the PCI bus, this is the state referred to as 'D0' (step 407). The kernel then notifies the hot plug layer that the device has been inserted (e.g., simulating a hot plug insert) (step 409). Depending upon the severity of the error, the error can be corrected by the initialization routines, when the device is called for the next time or when the resources become available.

The following is an example set of codes implementing the example embodiment of using the PCI bus in the Linux™ kernel. Here, error handling codes have been removed for clarity.

```
void pci_device_failed(struct pci_dev *pdev)
{
    u8 flag;
    /* Clear the master flag */
    pci_read_config_byte(pdev, PCI_COMMAND, &flag);
    flag &= ~PCI_COMMAND_MASTER;  /* Fence the device off */
    pci_write_config_byte(pdev, PCI_COMMAND, flag);
    printk(KERN_WARNING "Device %s has failed and is being restarted.\n",
        pdev->slotname);
    INIT_WORK(&pdev->recovery, pci_recover_device,pdev);
    schedule_work(&pdev->recovery);
}
/* Called as soon as convenient by the schedule_work request */
void pci_recover_device(void *arg)
{
    struct pci_dev *pdev = arg;
    /* Simulate the removal of the hardware */
    pci_remove_device(dev);
    /* Place the device into D3 (off) state */
    pci_set_state(dev, 3);
    /* Leave power off briefly */
    set_current_state(TASK_UNINTERRUPTIBLE):
    schedule_timeout(HZ/10);
    /* Place the device into D0 (on) state */
    pci_set_state(dev, 0);
    /* Simulate the hot insertion of the hardware */
    pci_insert_device(dev);
    printk(KERN_WARNING "Device %s has been restarted.\n",
        pdev->slotname);
}
```

The above routine is similar to physically turning off/on the I/O device. As noted above, by turning off/on, the existing initialization routine is used, which is usually standardized and well-tested. Such an initialization routine typically includes the logic to test the I/O device for proper functions (e.g., setting up the I/O device, testing the connections, testing the power, etc.).

Although the above example uses the PCI bus, the present invention is directly applicable to any I/O bus where operating systems have interfaces for handling the dynamic addition and removal of devices (e.g., hot plugging), and the ability to reset or power cycle I/O device in software exists. More specifically, for I/O devices connected to a bus that allows the kernel to control turning off/on the devices (e.g., the PCI bus, Accelerated Graphics Port (AGP), etc.), the kernel may contain codes similar to the above provided example. For the I/O devices connected to a bus that allows the kernel to physically turn off/on the devices (e.g., the USB bus, Cardbus, PCMCIA, etc.), the kernel contains codes necessary to physically turning off/on the devices. In other words, as long as the architecture of a bus allows either simulated or physical powering off/on of I/O devices connected thereto, the present invention is applicable to such a bus.

While there have been shown and described examples of the present invention, it will be readily apparent to those skilled in the art that various changes and modifications may be made without departing from the scope of the invention as defined by the following claims. The present invention is applicable to any operating system (e.g., Linux™, Unix, Microsoft Windows, MacOS, etc.) provided they have hot plug interfaces or the like. Accordingly, the invention is limited only by the following claims and equivalents thereto.

What is claimed is:

1. A method for correcting an error of a device connected to a computer during run time without rebooting the computer, comprising:
   simulating with an operating system of the computer a removal of the device from the computer by invoking first software instructions that are the same as a first set of software instructions used when the device is removed by a user;
   the operating system automatically turning off the device;
   the operating system automatically turning on the device; and
   simulating with the operating system an insertion of the device to the computer, by invoking second software instructions that are the same as a second set of software instructions used by the computer when the device is connected to the computer by a user, wherein the first software instructions and second software instructions are a set of pre-existing initialization routines of the operating system that correct the error.

2. The method of claim 1, further including fencing the device from its I/O bus prior to the step of simulating with the operating system a removal of the device.

3. The method of claim 2, wherein fencing the device includes at least one of: disabling data I/O, disabling memory and disabling bus-mastering.

4. The method of claim 1, wherein automatically turning off the device includes placing the device into a D3 state in a PCI interface.

5. The method of claim 1, wherein automatically turning on the device includes placing the device into a D0 state in a PCI interface.

6. The method of claim 1, further including holding the device turned off for a predetermined period of time.

7. The method of claim 5, wherein the predetermined time is substantially equal to a tenth of a second.

8. The method of claim 1, wherein the set of pre-existing routines is configured to correct the error when computing resources become available.

9. The method of claim 1, wherein the set of pre-existing routines is configured to correct the error when the device is called.

10. A system for correcting an error of a device connected to a computer during run time without rebooting the computer using a pre-existing initialization routine of an operating system of the computer, comprising:
- the computer, including the operating system;
- means within the operating system for simulating a removal of the device from the computer by invoking first software instructions that are the same as a first set of software instructions used when the device is removed by a user;
- means within the operating system for automatically powering off and powering on the device; and
- means within the operating system for simulating an insertion of the device to the computer by invoking second software instructions that are the same as a second set of software instructions used by the computer when the device is connected to the computer by a user, wherein the first software instructions and second software instructions are a set of pre-existing initialization routines of the operating system that correct the error.

11. The system of claim 10, further including means for fencing the device from its I/O bus.

12. The system of claim 11, wherein fencing the device includes at least one of: disabling data I/O, disabling memory and disabling bus-mastering.

13. The system of claim 10, further including holding the device turned off for a predetermined period of time.

14. The system of claim 13, wherein the predetermined time is substantially equal to a tenth of a second.

15. The system of claim 10, wherein the set of pre-existing routines is configured to correct the error when computing resources become available.

16. The system of claim 10, wherein the set of pre-existing routines is configured to correct the error when the device is called.

17. A computer program product, residing on a computer-readable medium, for use in handling an error of a device, the computer program product comprising instructions for causing an operating system of a computer to:
- simulate a removal of the device from the computer by invoking first software instructions that are the same as a first set of software instructions used when the device is removed from the computer by a user;
- automatically turn off the device;
- automatically turn on the device; and
- simulate an insertion of the device to the computer by invoking second software instructions that are the same as a second set of software instructions used by the computer when the device is connected to the computer by a user, wherein the first software instructions and second software instructions are a set of pre-existing initialization routines that correct the error.

18. The computer product of claim 17, wherein the set of pre-existing routines is configured to correct the error when computing resources become available.

19. The computer product of claim 18, wherein the set of pre-existing routines is configured to correct the error when the device is called.

* * * * *